United States Patent
Sun et al.

(10) Patent No.: US 7,532,266 B2
(45) Date of Patent: May 12, 2009

(54) ACTIVE MATRIX SUBSTRATE

(75) Inventors: Wei-Chieh Sun, Taipei County (TW); Ching-Chuan Chen, Taipei (TW); Wei-Hsiung Huang, Hsinchu (TW); Shu-I Huang, Taipei (TW)

(73) Assignee: Au Optronics Corporation, Hsinchu (TW)

( * ) Notice: Subject to any disclaimer, the term of this patent is extended or adjusted under 35 U.S.C. 154(b) by 113 days.

(21) Appl. No.: 11/457,142

(22) Filed: Jul. 12, 2006

(65) Prior Publication Data

US 2007/0132931 A1 Jun. 14, 2007

(30) Foreign Application Priority Data

Dec. 12, 2005 (TW) .............................. 94143844 A (51) Int. Cl.
 *G02F 1/1333* (2006.01)
 *G02F 1/1345* (2006.01)
(52) U.S. Cl. .................. 349/40; 349/149; 349/150; 349/151; 349/152
(58) Field of Classification Search .................. 349/40, 349/149–152
See application file for complete search history.

(56) References Cited

U.S. PATENT DOCUMENTS

| | | | |
|---|---|---|---|
| 5,596,342 A | | 1/1997 | Ikezaki et al. |
| 6,163,352 A * | | 12/2000 | Ichikawa et al. ............. 349/106 |
| 6,686,987 B1 * | | 2/2004 | Sakaki et al. ............... 349/149 |
| 6,693,301 B2 * | | 2/2004 | Takemura .................... 257/72 |
| 6,781,403 B2 * | | 8/2004 | Kim ........................... 324/770 |
| 6,844,629 B2 | | 1/2005 | Chen et al. |
| 2002/0036606 A1 * | | 3/2002 | Ichikawa et al. .............. 345/87 |
| 2002/0126250 A1 * | | 9/2002 | Ozawa ....................... 349/187 |
| 2004/0001176 A1 * | | 1/2004 | Kim et al. ................... 349/139 |
| 2004/0033636 A1 | | 2/2004 | Tang et al. |
| 2004/0150351 A1 * | | 8/2004 | Komiya et al. ........... 315/169.3 |
| 2004/0246427 A1 * | | 12/2004 | Iwanaga et al. ............. 349/149 |
| 2005/0032343 A1 | | 2/2005 | Wu et al. |
| 2005/0121796 A1 * | | 6/2005 | Park et al. ................... 257/773 |
| 2006/0007086 A1 * | | 1/2006 | Rhee et al. .................... 345/87 |

FOREIGN PATENT DOCUMENTS

CN 1503040 6/2004
CN 1621925 6/2005

\* cited by examiner

*Primary Examiner*—K. Cyrus Kianni
(74) *Attorney, Agent, or Firm*—Jianq Chyun IP Office (57) ABSTRACT

An active matrix substrate including a substrate, a pixel array, and a peripheral circuit is provided. The substrate has a display region and a peripheral circuit region adjacent thereto. The pixel array is disposed in the display region. The peripheral circuit is disposed in the peripheral circuit region and includes a first signal line, a second signal line, a first bypass-line, a second bypass-line, a plurality of chip bonding pads, a first dummy bonding pad and a plurality of second dummy bonding pads. The first bypass-line and the first signal line transmit the same signal. The second bypass-line and the second signal line transmit the same signal. The chip bonding pads are disposed between the bypass-lines and the pixel array, and are connected to the pixel array. The first dummy bonding pad is connected to the first bypass-line. Each second dummy bonding pad is connected to the second bypass-line.

2 Claims, 8 Drawing Sheets

ACTIVE MATRIX SUBSTRATE

CROSS-REFERENCE TO RELATED APPLICATION

This application claims the priority benefit of Taiwan application Ser. No. 94143844, filed on Dec. 12, 2005. All disclosure of the Taiwan application is incorporated herein by reference.

BACKGROUND OF THE INVENTION

1. Field of Invention

The present invention relates to an active matrix substrate. More particularly, the present invention relates to an active matrix substrate with bypass-lines.

2. Description of Related Art

To meet the life style today, the volumes of video apparatuses are getting smaller and lighter. Though the conventional cathode ray tube (CRT) display still has its advantages, the volume thereof is considered bulky and space-consuming because of the internal electron gun structure thereof. Besides, radiant rays are generated while the CRT display output images, which may injure the viewer's eyes. Accordingly, flat panel display (FPD), for example, liquid crystal display (LCD), developed with optoelectronic technology and semiconductor technology has become the mainstream of display products.

Figure 1A:
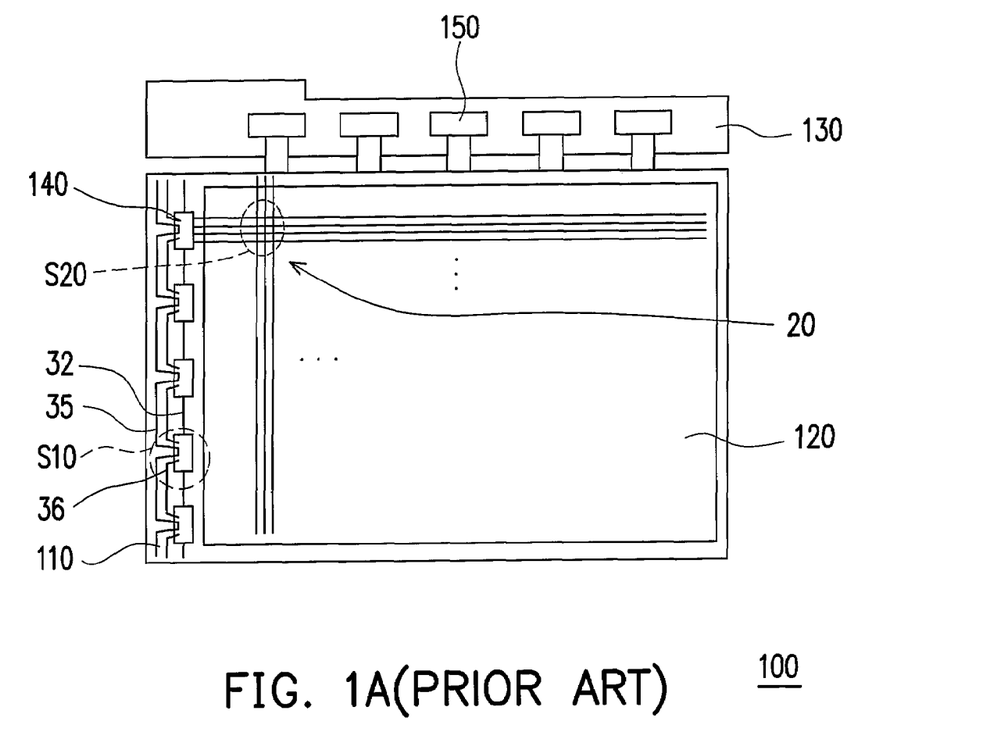
FIG. 1A is a structural diagram of a conventional LCD panel.
Figure 1B:
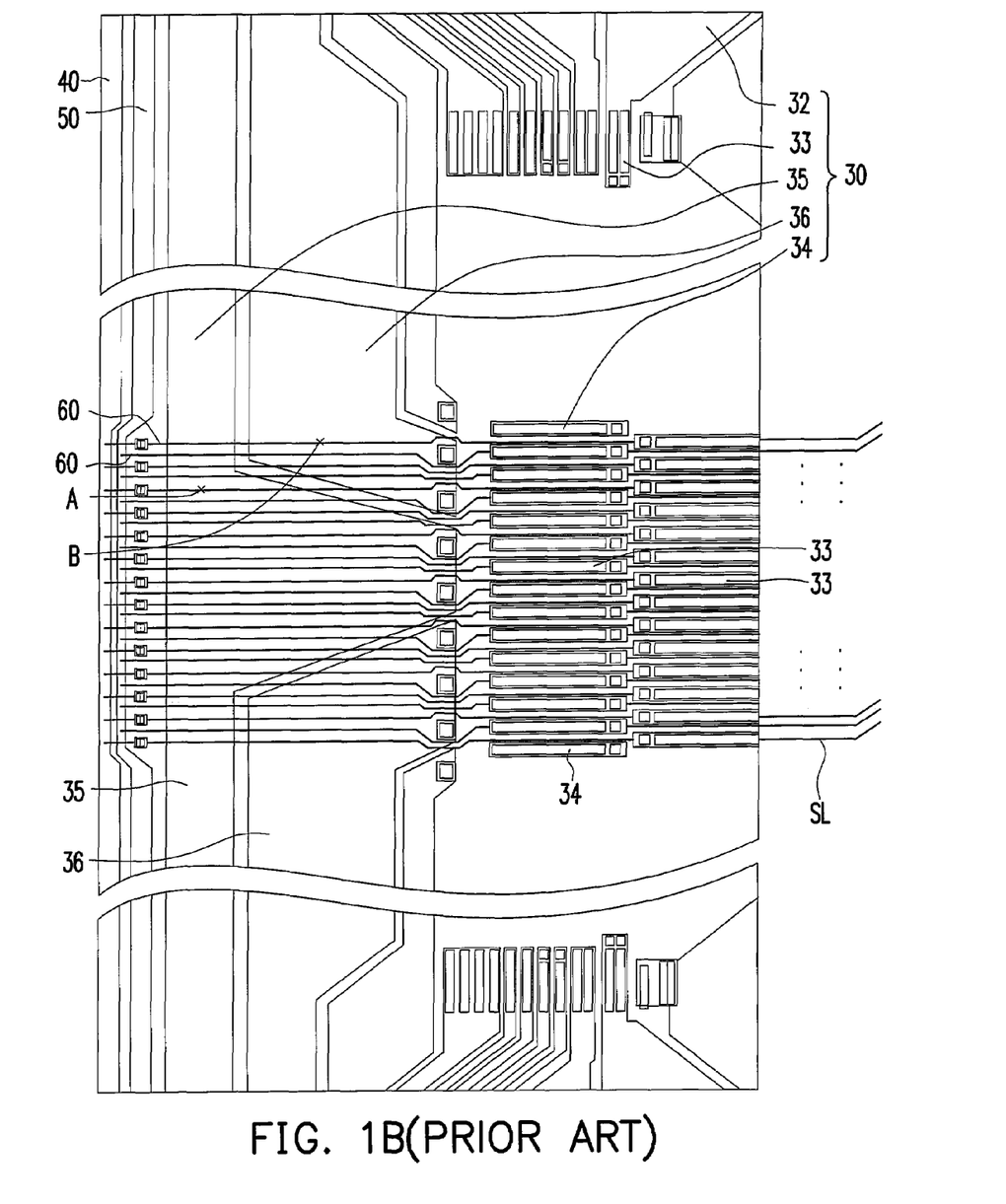
FIG. 1B is a partial enlarged view of the region S10 of the TFT substrate in FIG. 1A.
Figure 1C:
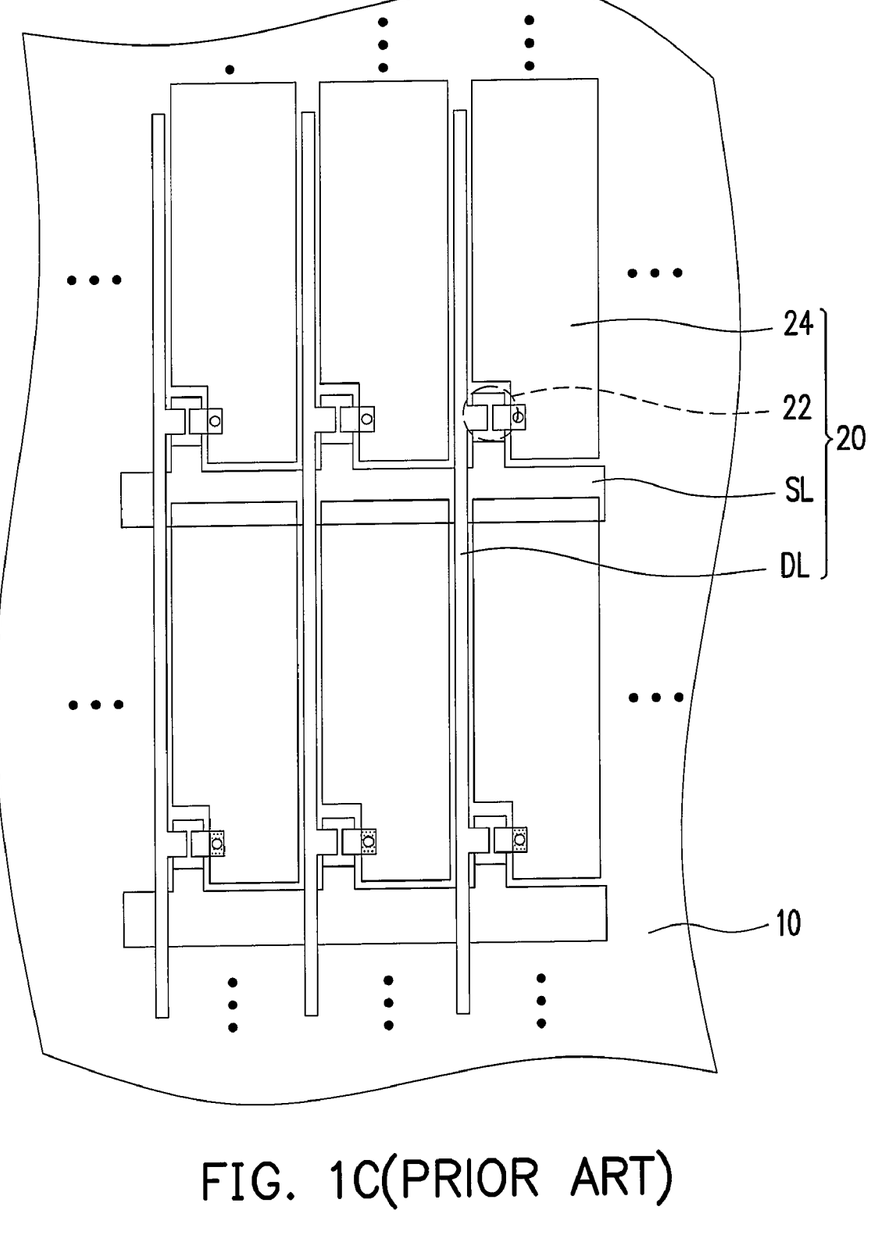
FIG. 1C is a partial enlarged view of the region S20 of the TFT substrate in FIG. 1A.

FIG. 1A is a structural diagram of a conventional LCD panel. FIG. 1B is a partial enlarged view of the region S10 of the TFT substrate in FIG. 1A. FIG. 1C is a partial enlarged view of the region S20 of the TFT substrate. in FIG. 1A. First, referring to FIG. 1A, the conventional LCD panel 100 includes a TFT substrate 110, a color filter substrate 120, a printed circuit board 130, a plurality of gate driver ICs 140, and a plurality of data driver ICs 150. The color filter substrate 120 is disposed over the TFT substrate 110. A plurality of data driver ICs 150 are disposed on the printed circuit board 130 and are connected to the data lines (denoted DL in FIG. 1C) of the TFT substrate 110. In addition, the gate driver ICs 140 are connected to the scan lines (denoted SL in FIGS. 1B and 1C) of the TFT substrate 110, and the data driver ICs 150 on the printed circuit board 130 and the gate driver ICs 140 are used for driving the pixel array 20 of the TFT substrate 110.

Referring to FIGS. 1B and 1C again, the foregoing TFT substrate 110 includes a glass substrate 10, a pixel array 20, a peripheral circuit 30, a plurality of shorting bars 40, 50, and a plurality of jumper wires 60. The pixel array 20, the peripheral circuit 30, the shorting bars 40, 50, and the jumper wires 60 are all disposed on the glass substrate 10.

The pixel array 20 comprises a plurality of thin film transistors 22, a plurality of pixel electrodes 24, a plurality of scan lines SL, and a plurality of data lines DL. Each of the thin film transistors 22 is electrically connected to the corresponding scan line SL and data line DL, and each of the pixel electrodes 24 is electrically connected to the corresponding thin film transistor 22.

The peripheral circuit 30 includes a plurality of signal lines 32, a plurality of chip bonding pads 33, a plurality of dummy bonding pads 34, and a plurality of bypass-lines 35, 36. The chip bonding pads 33, for bonding the gate driver ICs 140 and the TFT substrate 110, are located between the bypass-lines 35, 36 and the pixel array 20 and electrically connected to the scan lines SL respectively. The gate driver ICs 140 bonded with the TFT substrate 110 are electrically connected to each other in a cascade through signal lines 32. The shorting bar 40 connects all odd jumper wires 60, and another shorting bar 50 connects all even jumper wires 60. The chip bonding pads 33 are connected between the jumper wires 60 and the scan lines SL. Please note that the bypass-lines 35, 36 are located between the shorting bars 40, 50 and the signal lines 32, and are electrically connected to the corresponding signal lines 32 respectively. The dummy bonding pads 34 are electrically insulated from the pixel array 20 and are located at the outside of the chip bonding pads 33.

To drive the pixel array 20 on the LCD panel 100, relative circuits and chips have to be fabricated around the LCD panel 100 so that voltages and signals can be supplied to the scan lines SL and data lines DL of the pixel array 20. The printed circuit board 130 as shown in FIG. 1A is electrically connected to the data lines DL of the TFT substrate 110 so that data signals can be supplied to the data lines DL. In addition, the plurality of gate driver ICs 140 are bonded on the glass substrate 10 of the TFT substrate 110 using chip on glass (COG) technology, and the gate driver ICs 140 are electrically connected with the scan lines SL of the TFT substrate 110 so that scan signals can be supplied to the scan lines SL.

Please note that the exposed surface area at the left side of the TFT substrate 110 is very long and narrow after the color filter substrate 120 is disposed on the TFT substrate 110, and the gate driver ICs 140 are thus bonded on the TFT substrate 110 in a cascade by the signal lines 32 (as shown in FIG. 1A). However, the impedance of the signal lines 32 may cause voltage attenuation while transmitting relative voltages to the gate driver ICs 140; such situation may be worse in large LCD panels. To avoid the difference in the voltages transmitted to the gate driver ICs 140, the plurality of bypass-lines 35, 36 are disposed beside each gate driver IC 140 (as shown in FIG. 1A), and thus voltages supplied to every gate driver ICs 140 are the same. The detail description of such technology can be referred to the documents of the Patent No. TW 589598 and U.S. Pat. No. 6,844,629.

Referring to FIG. 1B again, a short circuit due to dropping foreign matter or other process factors is unavoidable in the fabricating process of the active matrix substrate 110. For example, in a fabricating process, if foreign objects drop at points A and B denoted in FIG. 1B, the jumper wires 60 located at points A and B are shorted with the bypass-lines 35 and 36 under the two jumper wires 60, respectively. However, the two jumper wires are short-circuited through the shorting bars 40, and therefore the two bypass-lines 35 and 36 under the points A and B may be short-circuited. During a array test, the testing probe is pressed against the dummy bonding pads 34 and a portion of the chip bonding pads 33 (the chip bonding pads 33 connected to the scan lines SL); since the bypass-lines 35 and 36 are not electrically connected to the dummy bonding pads 34 or the chip bonding pads 33 pressed by the probe (the chip bonding pad 33 connected to the scan lines SL), the voltage signals of the bypass-lines 35 and 36 can not be detected; accordingly, whether there is a short circuit between the bypass-lines 35 and 36 can not be detected. Generally speaking, the shorting bars 40 and 50 on the TFT substrate 110 remain after cell processes. During a cell test, since the testing machine uses the probe of, for example, tape automatic bonding (TAB) to test, the probe is directly pressed against the chip bonding pads 33 connected with the scan lines SL, thus whether there is a short circuit between the bypass-lines 35 and 36 can not be detected. After the TFT substrate 110 with a short circuit between the bypass-lines 35 and 36 and the color filter substrate 120 are assembled and filled with liquid crystal, the bonding process is performed. The printed circuit board 130 and the gate driver ICs 140 are bonded on the TFT substrate 110, and then the LCD panel 100 is completed. However, the display quality of the LCD panel 100 is not ideal when a module test is performed to the LCD panel 100 due to the short circuit between the bypass-lines 35 and 36. In other words, the short circuit between the bypass-lines 35 and 36 can only be detected during the module test. In addition, since the short circuit between the bypass-lines 35 and 36 is not detected during the array test, subsequent processes are performed continuously to fabricate the problematic TFT substrate 110, which does not only waste productivity, but also increases the manufacturing cost of the LCD panel 100.

SUMMARY OF THE INVENTION

Accordingly, it is an object of the present invention to provide an active matrix substrate, wherein short circuits of bypass-lines can be detected during the array test.

Based on the aforementioned and other objectives, the present invention provides an active matrix substrate including a substrate, a pixel array, and a peripheral circuit. The substrate has a display region and a peripheral circuit region adjacent to the display region. The pixel array is disposed in the display region on the substrate. The peripheral circuit is disposed in the peripheral circuit region on the substrate, and the peripheral circuit includes a first signal line, a second signal line, a first bypass-line, a second bypass-line, a plurality of chip bonding pads, a first dummy bonding pad, and a plurality of second dummy bonding pads. The first bypass-line and the first signal line transmit the same signal, and the second bypass-line and the second signal line transmit the same signal. The chip bonding pads are disposed between the bypass-lines and the pixel array, and are electrically connected to the pixel array. The first dummy bonding pad is electrically connected to the first bypass-line. Each of the second dummy bonding pads is electrically connected to the second bypass-line.

According to an embodiment of the present invention, the active matrix substrate further includes a plurality of connection lines disposed in the peripheral circuit region, wherein the first dummy bonding pad and each of the second dummy bonding pads are connected to the first and the second bypass-lines through the connection lines.

According to an embodiment of the present invention, in the active matrix substrate, the first dummy bonding pad and each of the second dummy bonding pads are located outside the chip bonding pads.

According to an embodiment of the present invention, in the active matrix substrate, the first bypass-line is a continuous trace.

According to an embodiment of the present invention, in the active matrix substrate, the second bypass-line is a discontinuous trace.

According to an embodiment of the present invention, the active matrix substrate further includes another dummy bonding pad electrically connected to the first bypass-line.

According to an embodiment of the present invention, the active matrix substrate further includes a plurality of shorting bars and a plurality of jumper wires. The shorting bars are disposed outside the first and the second bypass-lines. The jumper wires connect the shorting bars and the chip bonding pads, wherein the jumper wires jump over the first and the second bypass-lines. In addition, the first and the second bypass-lines are electrically insulated from the shorting bars.

According to an embodiment of the present invention, in the active matrix substrate, the pixel array includes a plurality of data lines, a plurality of scan lines, a plurality of active devices, and a plurality of pixel electrodes. The scan lines are electrically connected to the chip bonding pads. The active devices are electrically connected to a corresponding scan line and data line respectively. The pixel electrodes are electrically connected to a corresponding active device respectively. In addition, the active devices include thin film transistors.

In overview, in the active matrix substrate of the present invention, the first and the second bypass-lines are respectively connected to the corresponding first and second dummy bonding pads by one of the connection lines, and thus, short circuits between the first and the second bypass-lines can be detected during the array test.

In order to make the aforementioned and other objects, features and advantages of the present invention comprehensible, a preferred embodiment accompanied with figures is described in detail below.

It is to be understood that both the foregoing general description and the following detailed description are exemplary, and are intended to provide further explanation of the invention as claimed.

BRIEF DESCRIPTION OF THE DRAWINGS

The accompanying drawings are included to provide a further understanding of the invention, and are incorporated in and constitute a part of this specification. The drawings illustrate embodiments of the invention and, together with the description, serve to explain the principles of the invention.

DESCRIPTION OF EMBODIMENTS

Figure 2A:
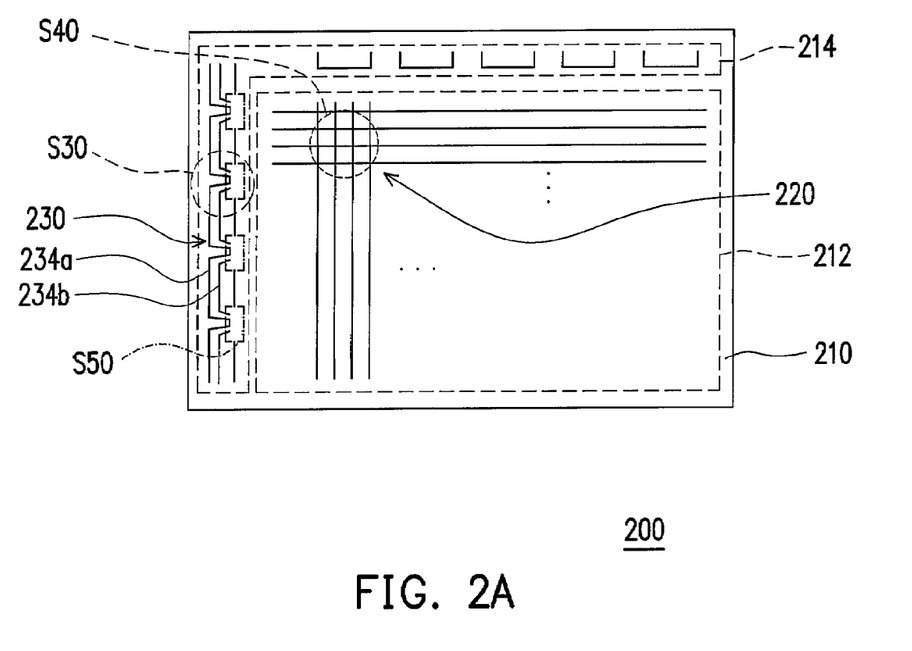
FIG. 2A is a structural diagram of an active matrix substrate according to an exemplary embodiment of the present invention.
Figure 2B:
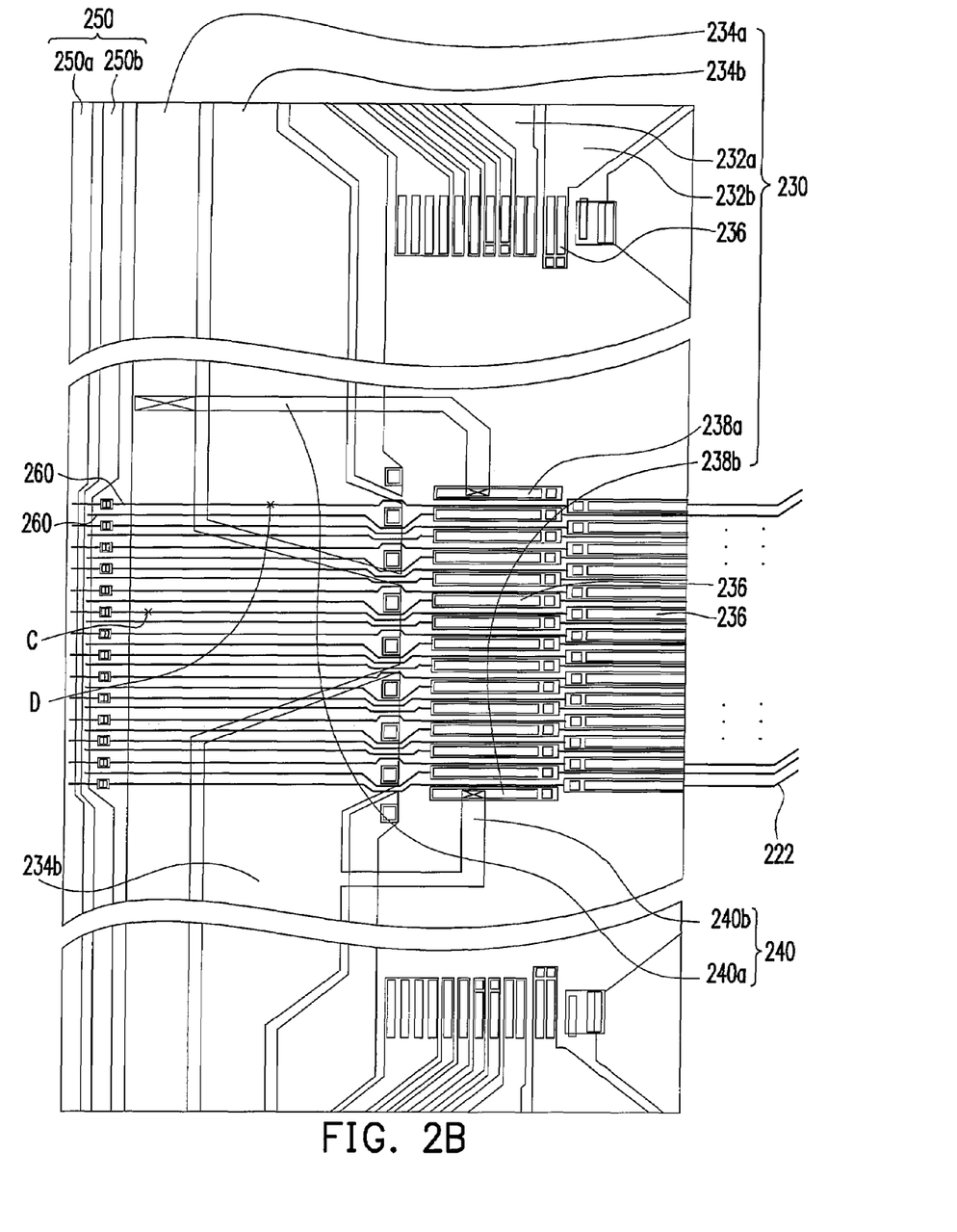
FIG. 2B is a partial enlarged view of the region S30 in FIG. 2A.
Figure 2C:
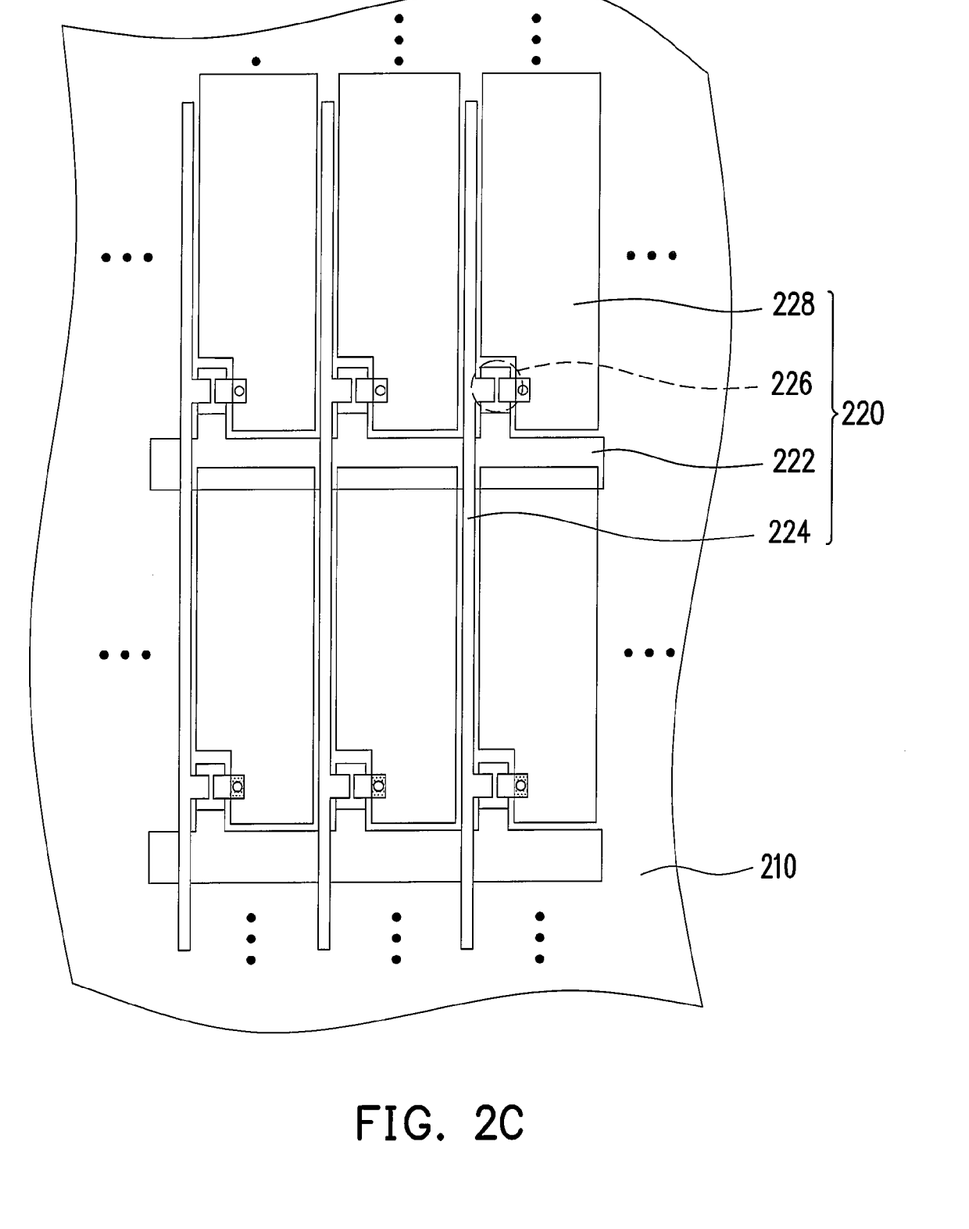
FIG. 2C is a partial enlarged view of the region S40 in FIG. 2A.

FIG. 2A is a structural diagram of an active matrix substrate according to an exemplary embodiment of the present invention. FIG. 2B is a partial enlarged view of the region S30 in FIG. 2A. FIG. 2C is a partial enlarged view of the region S40 in FIG. 2A. First, referring to FIGS. 2A and 2B, an active matrix substrate 200 includes a substrate 210, a pixel array 220, and a peripheral circuit 230. The substrate 210 is a, for example, glass substrate, quartz substrate, or substrate of other suitable material. The substrate 210 has a display region 212 and a peripheral circuit region 214, and the peripheral circuit region 214 is adjacent to the display region 212. The pixel array 220 is disposed in the display region 212 on the substrate 210. The peripheral circuit 230 is disposed in the peripheral circuit region 214 on the substrate 210 and the peripheral circuit 230 includes a first signal line 232a, a second signal line 232b, a first bypass-line 234a, a second bypass-line 234b, a plurality of chip bonding pads 236, at least one first dummy bonding pad 238a, and a plurality of second dummy bonding pads 238b. The first bypass-line 234a and the first signal line 232a transmit the same signal, and the second bypass-line 234b and the second signal line 232b transmit the same signal. The chip bonding pads 236 are disposed between the bypass-lines 234a, 234b and the pixel array 220, and are electrically connected with the pixel array 220. The first dummy bonding pad 238a and the second dummy bonding pads 238b are located at the outside of the chip bonding pads 236. The first dummy bonding pad 238a is electrically connected to the first bypass-line 234a. Each of the second dummy bonding pads 238b is electrically connected to the second bypass-line 234b.

In the active matrix substrate 200 of the present embodiment, a peripheral circuit 230 is fabricated in the peripheral circuit region 214 of the substrate 210, which is for bonding with circuit boards and chips. To be more specific, the substrate 210 is suitable for being bonded with a printed circuit board (not shown) so as to electrically connect the printed circuit board to the peripheral circuit 230 in the peripheral circuit region 214 for driving the data lines 224 of the pixel array 220. The substrate 210 is also suitable for bonding a plurality of gate driver ICs (not shown), and these gate driver ICs are bonded in the region S50 of the substrate 210 using chip on glass (COG) technology and are electrically connected to the peripheral circuit 230 in the peripheral circuit region 214 for transmitting signals through the scan lines 222 of the pixel array 220.

Figure 2D:
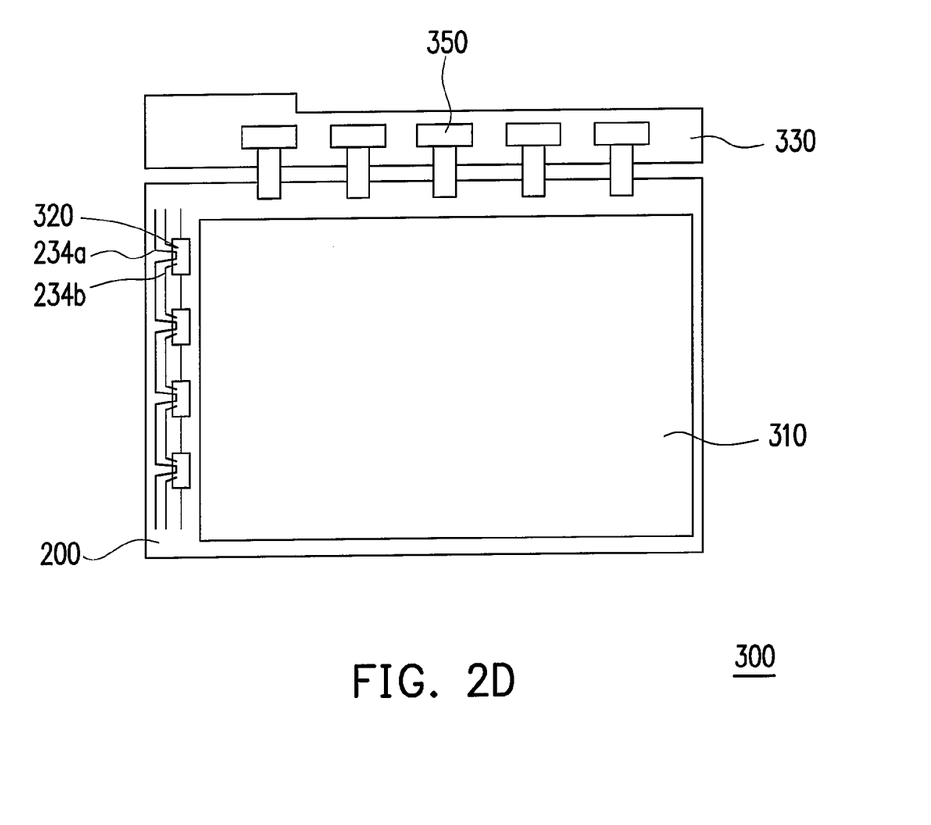
FIG. 2D is a structural diagram of an LCD panel formed by the active matrix substrate in FIG. 2A.
Figure 2E:
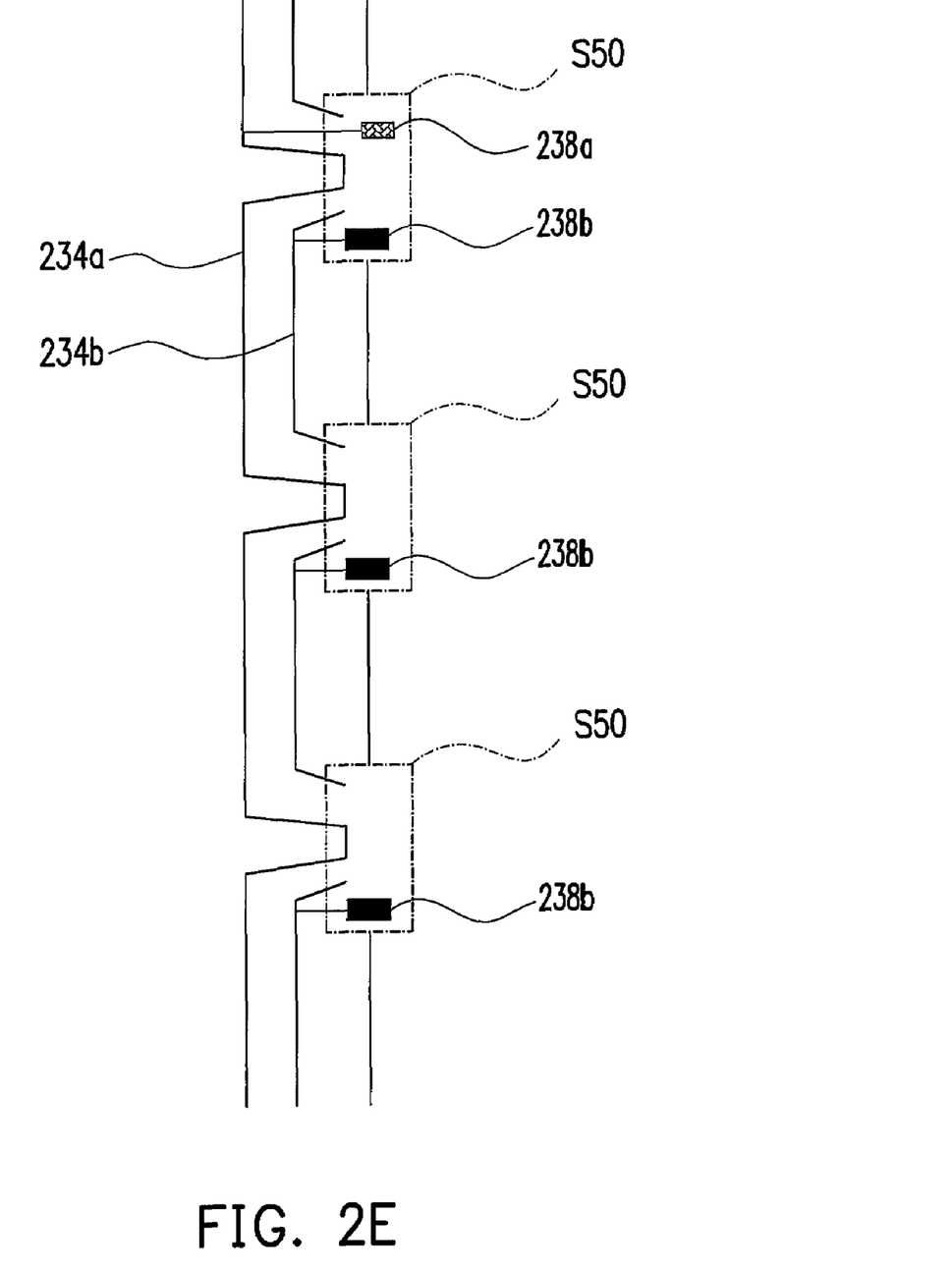
FIG. 2E is a diagram illustrating the electrical connections respectively between the first dummy bonding pad and the first bypass-line, and between the second dummy bonding pad and the second bypass-line.

Besides the aforementioned various components, the active matrix substrate 200 further includes a plurality of connection lines 240 disposed in the peripheral circuit region 214, and the material of the connection lines 240 is, for example, indium tin oxide (ITO), metal, or other suitable conductive materials. In the present embodiment, for the convenience of describing the connections, the connection lines 240 are respectively denoted as connection line 240a and connection line 240b. The first dummy bonding pad 238a is connected to the first bypass-line 234a by the connection line 240a, and the second dummy bonding pads 238b are connected to the second bypass-line 234b by the connection lines 240b. FIG. 2E is a diagram illustrating the electrical connections respectively between the first dummy bonding pad 238a and the first bypass-line 234a, and between the second dummy bonding pad 238b and the second bypass-line 234b. As shown in FIG. 2E, the first bypass-line 234a is a continuous trace, and the second bypass-line 234b is a discontinuous trace. In FIG. 2B, the connection line 240a is electrically connected to the first dummy bonding pad 238a and the first bypass-line 234a, and the connection line 240a spans over the second bypass-line 234b and is electrically insulated from the second bypass-line 234b. The connection line 240b is electrically connected to the second dummy bonding pads 238b and the second bypass-line 234b. In addition, the active matrix substrate 200 further includes a plurality of shorting bars 250 and a plurality of jumper wires 260. The shorting bars 250 are disposed outside the first bypass-line 234a and the second bypass-line 234b, and the first bypass-line 234a and the second bypass-line 234b are both electrically insulated from the shorting bars 250. The jumper wires 260 connect the shorting bars 250 and the chip bonding pads 236, and the jumper wires 260 jump over the first bypass-line 234a and the second bypass-line 234b. For the convenience of describing the connections, the shorting bars 250 are respectively denoted as shorting bar 250a and shorting bar 250b. In FIG. 2B, the shorting bar 250a connects all odd jumper wires 260 and the shorting bar 250b connects all even jumper wires 260.

Note that even only one first dummy bonding pad 238a is illustrated in FIG. 2B, the active matrix substrate 200 may further include another first dummy bonding pad 238a, which means the number of the first dummy bonding pads 238a can be greater than or equal to 2. The other first dummy bonding pads 238a are respectively located in the region S50 bonding various chips and are electrically connected to the first bypass-line 234a.

Referring to FIG. 2C, the pixel array 220 of the active matrix substrate 200 includes a plurality of scan lines 222, a plurality of data lines 224, a plurality of active devices 226, and a plurality of pixel electrodes 228. The scan lines 222 may be aluminum alloy wires or wires of other suitable conductive materials, data lines 224 may be chromium wires, aluminum alloy wires, or wires of other suitable conductive materials, and scan lines 222 are respectively connected to the chip bonding pads 236. The active devices 226 are, for example, thin film transistors or other tri-polar switching devices, and are electrically connected to the corresponding scan lines 222 and data lines 224 respectively. The pixel electrodes 228 are electrically connected to the corresponding active devices 226; the pixel electrodes 228 are, for example, transmissive electrodes, reflective electrodes, or transflective electrodes; and the material of the pixel electrodes 228 may be indium tin oxide (ITO), indium zinc oxide (IZO), metal or other transmissive or transflective conductive materials.

If the jumper wires 260 at points C and D in FIG. 2B are shorted with the first bypass-line 234a and the second bypass-line 234b under the two jumper wires 260, respectively, the first bypass-line 234a and the second bypass-line 234b under the points C and D may be short-circuited since the shorting bar 250a connects the two jumper wires 260. However, the first bypass-line 234a and the second bypass-line 234b are respectively connected to the corresponding first dummy bonding pad 238a and the second dummy bonding pads 238b through the connection lines 240a and 240b. During the array test, the probe of the testing machine is pressed against the first dummy bonding pad 238a, the second dummy bonding pad 238b, and a portion of chip bonding pads 236 (the chip bonding pads connected to the scan lines 222), and thus the voltage signals of the first bypass-line 234a and the second bypass-line 234b can be detected. Whether the first bypass-line 234a and the second bypass-line 234b are short-circuited can be detected through adjusting the parameters of the array test machine. For example, assuming that under a normal situation, the voltage supplied to the first bypass-line 234a is $V_1$, and the voltage supplied to the second bypass-line 234b is $V_2$. If the difference between the detected voltage signals $V_1'$ and $V_2'$ of the first dummy bonding pad 238a and the second dummy bonding pad 238b and $V_1$ and $V_2$ is small, the first bypass-line 234a and the second bypass-line 234b can be determined as electrically insulated. Contrarily, if the difference between the detected voltage signals of the first dummy bonding pad 238a and the second dummy bonding pad 238b ($V_1'$, $V_2'$) and $V_1$ and $V_2$ is large, a short circuit may occur between the first bypass-line 234a and the second bypass-line 234b.

The foregoing active matrix substrate 200 can be used for assembling LCD panel. FIG. 2D is a structural diagram of an LCD panel formed by the active matrix substrate in FIG. 2A. Referring to FIG. 2D, the LCD panel 300 includes a color filter substrate 310, a plurality of gate driver ICs 320, a printed circuit board 330, a plurality of data driver ICs 350, and the forgoing active matrix substrate 200. The color filter substrate 310 is disposed over the active matrix substrate 200, and a liquid crystal layer (not shown) is disposed between the color filter substrate 310 and the active matrix substrate 200. A plurality of data driver ICs 350 are disposed on the printed circuit board 330, and the printed circuit board 330 is connected to the active matrix substrate 200 for transmitting signals through the data lines 224 of the pixel array 220. The gate driver ICs 320 are bonded on the active matrix substrate 200 for transmitting signals through the scan lines 222 of the pixel array 220.

Since the short circuit between the first bypass-line 234a and the second bypass-line 234b of the active matrix substrate 200 can be detected during the array test, the active matrix substrate 200 can be repaired in advance or no subsequent process is performed to the active matrix substrate 200, so as to avoid yield waste. In other words, the manufacturing cost of the LCD panel 300 can be reduced effectively.

In overview, the active matrix substrate of the present invention has at least the following advantages:

1. In the active matrix substrate according to the preferred embodiment of the present invention, the first bypass-line and the second bypass-line are respectively connected to the corresponding first dummy bonding pad and the second dummy bonding pads through the connection lines. During the array test, the probe is pressed against the first dummy bonding pad, the second dummy bonding pad, and the chip bonding pads connected to the scan lines, so that a short circuit between the first and the second bypass-lines can be detected through adjusting the parameters of the array test machine,.

2. To detect whether there is a short circuit between the first and the second bypass-lines of the active matrix substrate, only the parameters of the array test machine need to be changed, and no additional equipment is needed.

3. Since a short circuit between the first and the second bypass-lines can be detected during the array test, the problematic active matrix substrate can be repaired in advance or subsequent processes can be stopped, so that yield waste can be avoided and the manufacturing cost of LCD panels can be reduced.

It will be apparent to those skilled in the art that various modifications and variations can be made to the structure of the present invention without departing from the scope or spirit of the invention. In view of the foregoing, it is intended that the present invention cover modifications and variations of this invention provided they fall within the scope of the following claims and their equivalents.

What is claimed is:

1. An active matrix substrate, comprising:
    a substrate having a display region and a peripheral circuit region adjacent to the display region;
    a pixel array disposed in the display region on the substrate;
    a peripheral circuit, disposed in the peripheral circuit region on the substrate, comprising:
        a first signal line and a second signal line;
        a first bypass-line and a second bypass-line, wherein the first bypass-line and the first signal line are adapted to transmit a first signal, and the second bypass-line and the second signal line are adapted to transmit a second signal;
        a plurality of chip bonding pads disposed between the first and second bypass-lines and the pixel array and electrically connected to the pixel array;
        a first dummy bonding pad electrically connected to the first bypass-line; and
        a plurality of second dummy bonding pads, wherein each of the plurality of second dummy bonding pads is electrically connected to the second bypass-line;
    a plurality of shorting bars disposed outside the first and the second bypass-lines; and
    a plurality of jumper wires connected to the plurality of shorting bars and the chip bonding pads, wherein the plurality of jumper wires is configured to span over the first and the second bypass-lines.

2. The active matrix substrate as claimed in claim 1, wherein the first and the second bypass-lines are electrically insulated from the plurality of shorting bars.

* * * * *